US012567912B2

(12) United States Patent
Adib et al.

(10) Patent No.: US 12,567,912 B2
(45) Date of Patent: Mar. 3, 2026

(54) VAN ATTA ACOUSTIC NETWORKS FOR LONG-RANGE UNDERWATER BACKSCATTER

(71) Applicant: Massachusetts Institute of Technology, Cambridge, MA (US)

(72) Inventors: Fadel Adib, Cambridge, MA (US); Waleed Akbar, Cambridge, MA (US); Aline Eid, Ann Arbor, MI (US); John Clayton Rademacher, Jr., Somerville, MA (US); Purui Wang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 152 days.

(21) Appl. No.: 18/424,033

(22) Filed: Jan. 26, 2024

(65) Prior Publication Data

US 2024/0259112 A1 Aug. 1, 2024

Related U.S. Application Data

(60) Provisional application No. 63/481,678, filed on Jan. 26, 2023.

(51) Int. Cl.
*H04B 11/00* (2006.01)
(52) U.S. Cl.
CPC .................................... *H04B 11/00* (2013.01)
(58) Field of Classification Search
CPC ................................ H04B 11/00; H04B 13/02
See application file for complete search history.

(56) References Cited

U.S. PATENT DOCUMENTS

| | | | | |
|---|---|---|---|---|
| 2,839,735 A | * | 6/1958 | Van ...................... | G10K 11/205 |
| | | | | 367/6 |
| 2,908,002 A | | 10/1959 | Van Atta | |
| 8,547,780 B2 | * | 10/2013 | Tiltman .............. | G10K 11/205 |
| | | | | 367/2 |
| 9,843,400 B2 | * | 12/2017 | Sinha ..................... | H04B 11/00 |
| 11,936,425 B1 | * | 3/2024 | Jim .................... | H04B 10/1123 |
| 2011/0266089 A1 | * | 11/2011 | Tiltman .............. | G10K 11/205 |
| | | | | 181/294 |
| 2024/0259112 A1 | * | 8/2024 | Adib ...................... | H04B 13/02 |

OTHER PUBLICATIONS

Afzal et al.; "Battery-free wireless imaging of underwater environments"; Nature Communications; 13:5546; Published online Sep. 26, 2022; 9 Pages.

(Continued)

*Primary Examiner* — Daniel Pihulic
(74) *Attorney, Agent, or Firm* — Daly, Crowley, Mofford & Durkee, LLP

(57) ABSTRACT

Described herein is a retroreflective underwater backscatter node comprising a receiver that receives an incoming acoustic signal from a first direction; a reflector that reflects back an incoming acoustic signal in a second direction; and a modulator coupled to the reflector to modulate the reflected incoming acoustic signal as a back-scattered signal. In some embodiments, the first direction and second direction are substantially the same such that the retroreflective underwater backscatter node retro-directs an incoming acoustic signal as a back-scattered signal and incoming and back-scattered acoustic signals propagate in the same but substantially opposite directions.

18 Claims, 12 Drawing Sheets

300 Van Atta Backscatter Network

State 1
State 2

310 330 Switch 340 320
Matching
350

(56)                References Cited

OTHER PUBLICATIONS

Afzal et al.; "Enabling Higher-Order Modulation for Underwater Backscatter Communication"; Institute of Electrical and Electronics Engineers [IEEE]; 2020; 7 Pages.

Eid et al.; "Rotman lens-based wide angular coverage and high-gain semipassive architecture for ultralong range mm-wave rfids"; IEEE Antennas and Wireless Propagation Letters; vol. 19, No. 11; Nov. 2020; 5 Pages.

Ghaffarivardavagh et al.; "Ultra-Wideband Underwater Backscatter via Piezoelectric Metamaterials"; SIGCOMM '20; Aug. 10-14, 2020; 13 Pages.

Hester et al.; "Inkjet-printed flexible mm-wave van-atta reflectar-rays: A solution for ultralong-range dense multitag and multisensing chipless rfid implementations for iot smart skins"; IEEE Transactions on Microwave Theory and Techniques; vol. 64, No. 12; Dec. 2016; 11 Pages.

Jang et al.; "Underwater Backscatter Networking"; SIGCOMM '19: Proceedings of the ACM Special Interest Group on Data Communication; Aug. 2019; 13 Pages.

Jayaraman; "Beyond IoT: Internet of Underwater Things to Network the Oceans"; Website: https://www.prescouter.com/2017/06/internet-of-underwater-things/; Accessed: Feb. 1, 2024; 4 Pages.

Kao et al.; "A comprehensive study on the internet of underwater things: applications, challenges, and channel models"; Sensors; Published Jun. 22, 2017; 20 Pages.

Li et al.; "A planar 2-d 8' 8 van atta retrodirective array for res enhancement in a wide angular range"; IEEE Transactions on Antennas and Propagation; vol. 70, No. 12; Dec. 2022; 6 Pages.

Liou et al.; "Internet of Underwater Things: Challenges and Routing Protocols"; Proceedings of IEEE International Conference on Applied System Innovation; Apr. 2018; 4 Pages.

Mazaheri et al.; "mmTag: A Millimeter Wave Backscatter Network"; In Proceedings of the 2021 ACM SIGCOMM '21; Aug. 23-27, 2021; 12 Pages.

MBARI (Monterey Bay Aquarium Research Institute); "Wave Glider Hot Spot Enabling autonomous devices to talk back"; https://www.mbari.org/technology/wave-glider-based-communications-hotspot/; Accessed: Feb. 1, 2024; 6 Pages.

Mora et al.; "How Many Species Are There on Earth and in the Ocean?'" PLOS Biology; 9(8); Aug. 23, 2011; 8 Pages.

Ocean Health Index; https://www.oceanhealthindex.org/; Accessed: Feb. 1, 2024; 4 Pages.

Seifert; "Ocean Vital Signs Are Stable, But Bill of Health Isn't Clean"; National Center for Ecological Analysis and Synthesis; Jul. 5, 2017; 7 Pages.

Sharp et al.; "Van Atta Reflector Array"; IRE Transactions on Antennas and Propagation; vol. 8, No. 4; Jul. 1960; 3 Pages.

Soltanaghaei et al.; "Millimetro: mmWave Retro-Reflective Tags for Accurate, Long Range Localization"; ACM MobiCom '21; Oct. 25-29, 2021; 14 Pages.

Stojanovic et al.; "Adaptive multichannel combining and equalization for underwater acoustic communications"; The Journal of Acoustical Society of America; 94(3); Sep. 1993; 29 Pages.

Texas Instruments Data Sheet; TS5A23160; Accessed: Feb. 1, 2024; 5 Pages.

Tseng et al.; "A planar van atta array reflector with retrodirectivity in both e-plane and h-plane"; IEEE Transactions on Antennas and Propagation; vol. 48, No. 2; Feb. 2000; 3 Pages.

Wong et al.; "A 2-d van atta array using star-shaped antenna elements"; IEEE Transactions on Antennas and Propagation; vol. 55, No. 4; Apr. 2007; 3 Pages.

Zhu; "Monitoring Environmental Conditions Near Underwater datacenters using Deep Learning"; Azure; Blog; Post Aug. 27, 2018; 7 Pages.

* cited by examiner

1D Van Atta Axis of Symmetry

1400

VAN ATTA ACOUSTIC NETWORKS FOR LONG-RANGE UNDERWATER BACKSCATTER

CROSS REFERENCE SECTION

This application claims benefit of U.S. Provisional Application No. 63/481,678 filed on Jan. 26, 2023, which is hereby incorporated herein by reference.

STATEMENT REGARDING FEDERALLY SPONSORED RESEARCH

This invention was made with government support under CNS1844280 awarded by the National Science Foundation, and N00014-20-1-2531 and N00014-19-1-2325 awarded by the Office of Naval Research. The government has certain rights in the invention.

BACKGROUND

Underwater backscatter offers a promising low cost and low power solution to underwater networking. Underwater backscatter nodes differ from traditional underwater communication technologies in that they communicate by reflecting rather than generating acoustic signals. In traditional underwater communication technologies, for example, a remote projector transmits an acoustic signal. When the signal reaches a backscatter node, it reflects in all directions, and a portion of this reflection arrives at a hydrophone (i.e. an underwater device which detects underwater signals). To communicate data, the backscatter node modulates its reflection coefficient, which allows a receiving hydrophone to sense changes in reflections and use them to decode the node's messages.

One factor that limits the range of underwater backscatter communication is the spherical spreading of backscattered signals propagating from a node back to the hydrophone. Specifically, when an underwater node backscatters a downlink signal, the resulting backscatter signal propagates to the hydrophone receiver but also scatters (or spreads) in all directions. Existing implementations of systems utilizing backscatter communications have only demonstrated few to tens of meters of range, making it difficult to deploy backscatter communication systems at scale.

SUMMARY

In accordance with a further aspect of the concepts, systems, device and techniques described herein, a retroreflective underwater backscatter node includes a receiver configured to receive an incoming acoustic signal from a certain direction; a reflector that reflects an incoming acoustic signal (i.e. an acoustic signal propagating general in the direction of the retroreflective underwater backscatter node and impinges upon the retroreflective underwater backscatter node) in a certain direction; and a modulator (hardware) that modulates reflected acoustic signals generated by the reflector.

In embodiments, a retroreflective underwater backscatter node may include one or more of the following features independently or in combination with one or more other features to include: a receiver and reflector arranged such that the retroreflective underwater backscatter node retrodirects the incoming signal so that the incoming and backscattered acoustic signals generally propagate along the same but opposite directions; the receiver and reflector arranged such that the underwater backscatter node retrodirects the incoming acoustic signal so that the incoming and back-scattered acoustic signals propagate at substantially the same angle but in opposite directions; the underwater backscatter node reflects the reflected acoustic signal in a direction different than the incoming acoustic signal; the underwater backscatter node includes at least one van-atta unit cell comprising two acoustic transducers connected or otherwise coupled to each other and the at least one van-atta unit cell is arranged to provide the underwater backscatter node having a retro-directivity characteristic using; the underwater backscatter node includes an array of van-atta unit cells; the retroreflective underwater backscatter node controls the direction of propagation of back-scattered acoustic signals (meaning the direction of reflection) by controlling phases of and/or relative phases between acoustic transducers in the array of van-atta unit cells; the underwater backscatter node includes an array of van-atta unit cells arranged to perform two-dimensional (2D) retro-directivity; the underwater backscatter node includes an array of van-atta unit cells arranged to perform three-dimensional (3D) retro-directivity; the underwater backscatter node includes a staggered array of van-atta unit cells; the receiver and reflector include acoustic transducers; the receiver and reflector include acoustic transducers are connected or otherwise coupled in a cross-polarized fashion (in-phase and counter-phase); the retroreflective underwater backscatter node includes a transformer; the modulator includes a switching circuit; the modulator includes a switching circuit arranged to perform digital modulation of reflected acoustic signals generated by the reflector; the modulator includes a switching circuit arranged to perform digital modulation of reflected acoustic signals generated by the reflector performed using an on-off-keying technique. The modulator includes a switching circuit arranged to perform digital modulation of reflected acoustic signals generated by the reflector where the digital modulation is performed using a higher-order modulation technique (PSK, ASK) (i.e., higher order than an on-off-keying technique); the modulator includes an analog modulation circuit such that modulation of reflected acoustic signals generated by the reflector is performed using analog modulation (analog backscatter) by connecting or otherwise coupling the output of a sensor to the retroreflective underwater backscatter node; and the signal direction of reflection is controlled by controlling the phases between the transducers in the node.

In accordance with a still further aspect of the concepts, systems, device and techniques described herein, an underwater communication system includes one or more backscatter nodes and an acoustic receiver (e.g. a hydrophone) with the one or more backscatter nodes responsive to intercepted acoustic signals with the one or more backscatter nodes configured to retro-direct the intercepted acoustic signals back toward the acoustic receiver and in response to a retro-direct the intercepted acoustic signal provided thereto, the acoustic receiver receives and decodes the retro-direct the intercepted acoustic signal.

In embodiments, an underwater communication system may include one or more of the following features independently or in combination with one or more other features to include: the one or more backscatter nodes are responsive to transmitted acoustic signals provided to the one or more backscatter nodes by a transmitter; a transmitter arranged proximate the acoustic receiver and which generates a transmitted acoustic signal; a transmitter arranged proximate the acoustic receiver and which generates a transmitted downlink acoustic signal; a transmitter arranged to perform beamforming; the acoustic receiver includes an array of receive elements coupled such that the acoustic receiver can perform beamforming.

In accordance with a still further aspect of the concepts, systems, device and techniques described herein, a Van Atta backscatter unit cell includes two or more acoustic transducers; one or more switches; and two or more transformers, wherein a first transformer is coupled to the switches and a first acoustic transducer and a second transformer coupled to the switches and a second acoustic transducer.

In embodiments, the Van Atta backscatter unit cell further includes two switches, wherein the switch alternates between an on and off position. In embodiments, the Van Atta backscatter unit cell further two switches, wherein the two switches are on and alternate between an in-phase polarity and a counter-phase polarity. In embodiments, the first transformer matches an impedance of the first acoustic transducer to an impedance of the second acoustic transducer.

In embodiments, the second transformer matches an impedance of the second acoustic transducer to an impedance of the first acoustic transducer. In embodiments, the first acoustic transducer and the second acoustic transducer are positioned symmetrically about a common axis of symmetry, further: the first acoustic transducer is positioned staggered compared to the second acoustic transducer along a 2D plane; the first acoustic transducer is positioned staggered compared to the second acoustic transducer along a 3D plane and along a center of symmetry; or the first acoustic transducer is positioned staggered compared to the second acoustic transducer along a 2D plane.

In accordance with a still further aspect of the concepts, systems, device and techniques described herein, a Van Atta backscatter array, includes two or more Van Atta backscatter unit cells, comprising: two or more acoustic transducers; one or more switches; and two or more transformers, with a first transformer coupled to the switches and a first acoustic transducer and a second transformer coupled to the switches and a second acoustic transducer, wherein a first Van Atta backscatter unit cell and a second Van Atta backscatter unit cell are positioned along a common axis of symmetry.

In embodiments, Van Atta backscatter array includes two switches, wherein the switch alternates between an on and off position. In embodiments, Van Atta backscatter array includes two switches, wherein the two switches are on and alternate between an in-phase polarity and a counter-phase polarity. In embodiments, the first transformer matches an impedance of the first acoustic transducer to an impedance of the second acoustic transducer.

In embodiments, the second transformer matches an impedance of the second acoustic transducer to an impedance of the first acoustic transducer. In embodiments, the first acoustic transducer and the second acoustic transducer are positioned symmetrically about a common axis of symmetry. In embodiments, the first acoustic transducer is positioned staggered compared to the second acoustic transducer along a 2D plane. In embodiments, the first acoustic transducer is positioned staggered compared to the second acoustic transducer along a 3D plane and along a center of symmetry. In embodiments, the first acoustic transducer is positioned staggered compared to the second acoustic transducer along a 2D plane. In embodiments, the first Van Atta backscatter unit cell and the second Van Atta backscatter unit cell are positioned symmetrically along a common axis of symmetry. In embodiments, the first Van Atta backscatter unit cell is positioned staggered compared to the second Van Atta backscatter unit cell along a 2D plane.

As noted, it should be appreciated that individual elements of different embodiments described herein may be combined to form other embodiments not specifically set forth above. Various elements, which are described in the context of a single embodiment, may also be provided separately or in any suitable or reasonable sub-combination. It should also be appreciated that other embodiments not specifically described herein are also within the scope of the claims.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Figure 1:
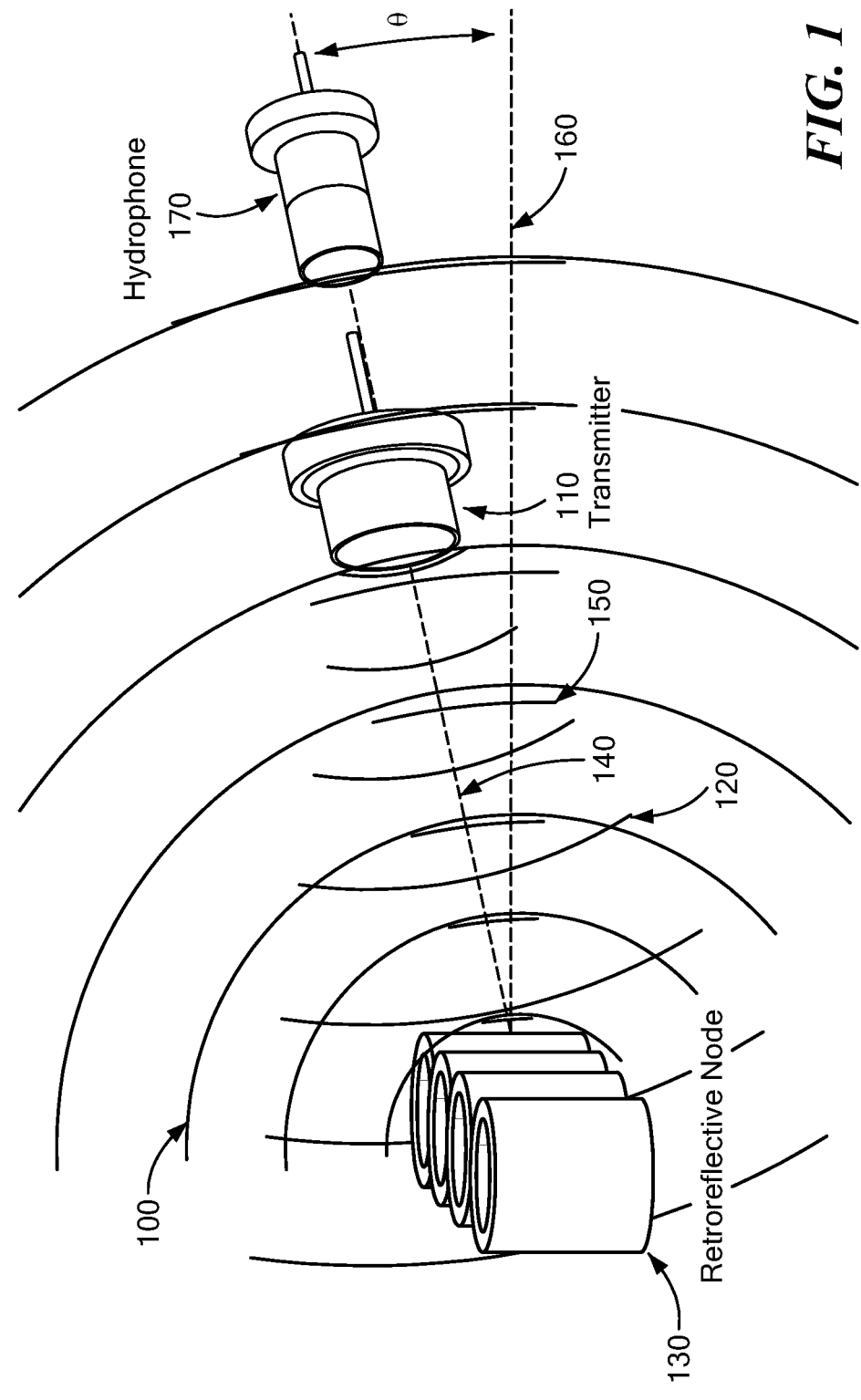
FIG. 1 is an example embodiment of a retroreflective underwater backscatter node.

FIG. 1 is an example embodiment of a retroreflective underwater backscatter node 100 for underwater backscatter. The retroreflective underwater backscatter node architecture enables ultra-low-power (ultra-low-power referring to a power consumption of less than 100 microwatts) long-range (long-range referring to a one-way distance greater than 100 meters) underwater networking over a wide angular coverage (wide angular coverage referring to a half-power beamwidth of greater than 90°).

In the example of FIG. 1, a signal source (or projector) 110 projects a signal 120 towards a retrodirective acoustic reflector 130 (reflector, node, and transducer may be used interchangeably throughout this disclosure). The reflector 130 includes a receiver that receives an incoming acoustic signal 120. The reflector 130 includes a modulator coupled to the reflector to modulate the reflected incoming acoustic signal 120 as a backscatter signal 150. At least a portion of the signal 120 propagates along a first direction 140 and arrives at retrodirective reflector 130. At least a portion of the signal which arrives at retrodirective reflector 130 is retro-directed as a backscatter signal 150 from reflector 130 in a second, different direction 160 toward a hydrophone 170.

The retroreflective underwater backscatter node 100 modulates acoustic reflections, through a retroreflective structure, such as the reflector 130. As used herein the term "retrodirectivity" refers to the concept of reflecting a signal back toward a source which generated the signal. A retrodirective structure (retrodirective or retroreflective may be used interchangeably throughout this disclosure) is a configuration of multiple Van Atta unit cells (which will be discussed below) in a linear, planar, or 3-dimensional (3D) arrangement. The retroreflective structure allows the VAB networking architecture 100 to boost the communication range of the underwater backscatter by up to an order of magnitude over other designs.

Structures like Van Atta have further advanced retrodirective RFID tags that can achieve long range communications at RF and millimeter-wave frequencies. The retroreflective underwater backscatter node 100 brings this type of structure to acoustic arrays, and does so in the context of underwater backscatter. Such an approach mitigates the spherical loss on the uplink, making the overall design efficient, and allowing for longer-range communications.

Figure 2:
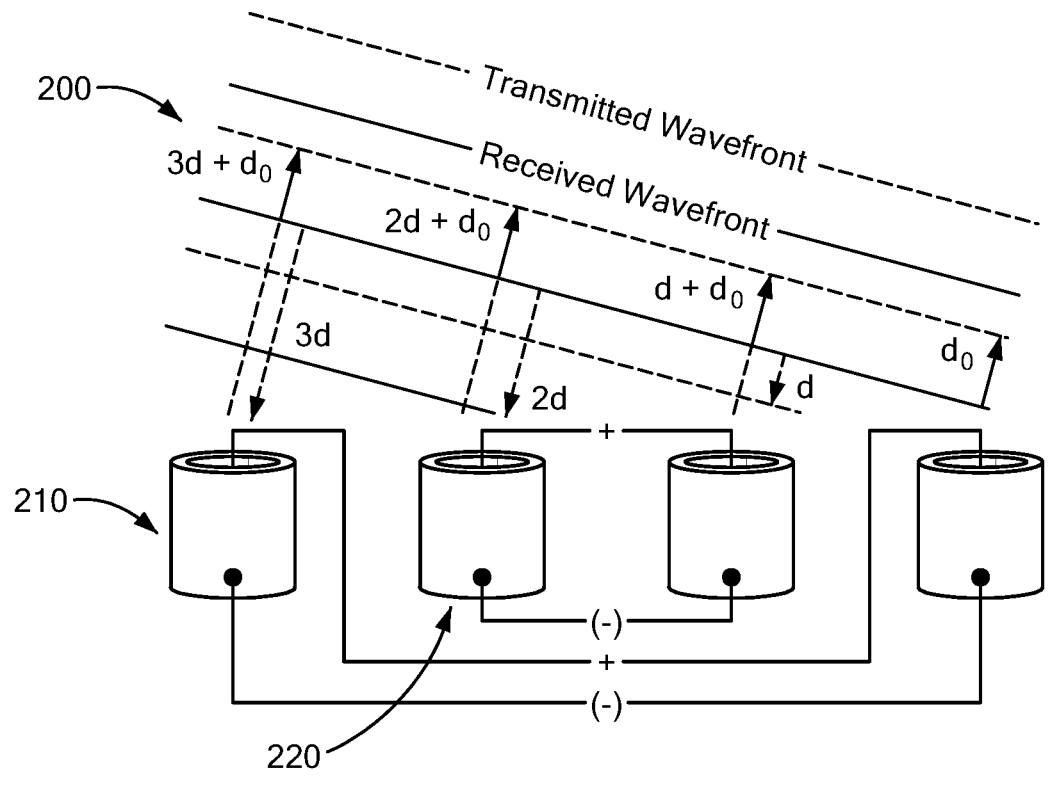
FIG. 2 is an example of Van Atta structures comprising of an array of nodes interconnected or otherwise coupled in symmetrical pairs.

FIG. 2 is an example 200 of Van Atta structures 210, 220, including a first van atta structure 210 and a second van atta structure 220. In FIG. 2, d represents the incremental distance that the incoming wavefront needs to travel in order to reach the antennas/nodes, while do represents a fixed constant that each outgoing wave must travel. Each Van Atta structure 210, 220 includes a pair of nodes interconnected or otherwise coupled with transmission lines of equal electrical length around a symmetry axis (i.e., Van Atta structures 210, 220, each comprise an array of nodes interconnected or otherwise coupled or otherwise coupled so as to form symmetrical pairs). As a result, a phase difference that is experienced by each node is the reverse of what is experienced by its counterpart. Reverse refers to the complex conjugate of the outgoing signal. With respect to phase, this means that the output phase equals the negative of the input phase. As an example, an input phase of positive 30 degrees would become an output phase of negative 30 degrees The nodes are thus arranged to produce a phase conjugated signal (i.e. the Van Atta structure 200 produces a physical transformation of the incident wave field (i.e., the incident plane wave) to produce a re-emitted plane wave having a propagation direction which is reversed from (i.e., opposite of) the propagation direction of the incident plane wave but the re-emitted plane wave keeps substantially the same amplitudes and phases as the amplitudes and phases of the incident plane wave. This conjugate phase-difference causes the reflected signal to be retrodirected in the direction of the impinging RF signal, effectively creating the same effect of active beamforming, while using a passive structure.

Using said Van Atta structures for underwater backscatter is challenging, primarily due to the electromechanical properties of underwater backscatter nodes. First, backscatter nodes are typically fabricated from piezoelectric materials, whose performance is highly reliant on the coupling between their electrical and mechanical components. Thus, unlike a pair of Van Atta antennas which can be easily coupled to each other to allow a signal to pass through them for retrodirectivity, directly connecting a pair of Van Atta piezoelectrics to each other would shift their resonance and drastically degrade their performance. Second, in order to operate at a desired resonant frequency (e.g., 20 kHz acoustics), these nodes need to have certain volumetric structures. As a result, placing multiple resonant nodes in close proximity causes them to block each other's acoustic signals. The blocking causes the underwater sound to diffract around their volumetric structures, creating new interactions that degrade the beamforming gain in ways that antenna Van Attas do not experience. These challenges make it difficult to design even a single-pair of underwater acoustic Van Atta retroreflective structures, let alone allowing us to scale these networks.

Figure 3:
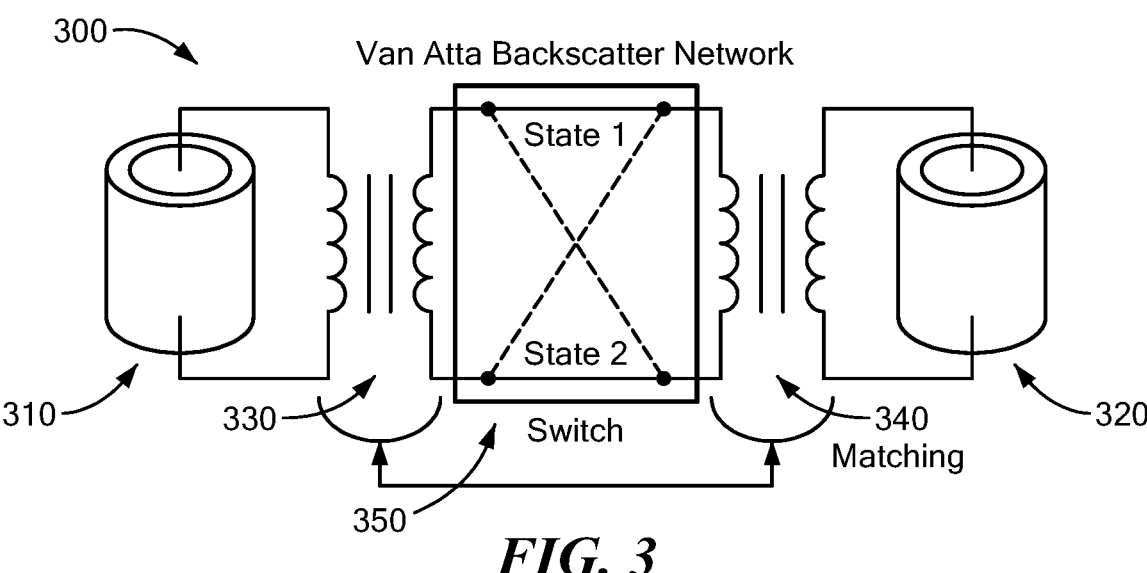
FIG. 3 is an example embodiment of a VAB unit cell comprising a first acoustic transducer connected or otherwise coupled to a second acoustic transducer through a switching and matching network.

FIG. 3 is an example embodiment of a VAB unit cell 300, wherein a first acoustic transducer 310 is coupled to a second acoustic transducer 320 through a switching and matching network. A first transformer 330 is coupled to a digital switching circuit 350 and the first acoustic transducer 310 and a second transformer 340 coupled to the switching circuit 350 and the second acoustic transducer 320. A van atta unit cell consists of two piezoelectric transducers, two transformers connecting the two transducers, and a cross-polarity switch. FIG. 3 describes a basic structure for the unit cell, however additional transducers may be used.

Node (including: node/piezoelectric; node/piezoacoustic backscatter; and node/piezoacoustic node) refers to a single fabricated piezoelectric transducer. In contrast, a van atta node can be a van atta unit cell or a combination of van atta unit cells used to construct a larger or a higher-dimensional van atta retroreflective structure.

The matching network employs a transformer 330, 340 at each node's input for matching. Each of the transformers 330, 340 enable matching of the impedance of their respective acoustic transducer 310, 320 to the impedance of the other acoustic transducer 310, 320, creating an end-to-end match and transforming the highly capacitive, complex valued node impedance into one that is entirely real. By setting the magnetizing inductance of each transformer as per the following equation:

$$L_m = \frac{-|Z_N|^2}{\text{Im}\{Z_N\}\omega} \tag{5}$$

where: $Z_N$ is the node impedance; and $\omega$ is the angular frequency, the node impedance becomes entirely real. This solution enables end-to-end matching, which increases the uplink signal-to-noise ratio (SNR). It also eliminates the need for large inductors (which are difficult to source) and enables full DC isolation between the node and the switching circuitry, since power transfer in a transformer is achieved through magnetic coupling.

The VAB unit cell 300 provides two improvements over conventional systems: first, a transformer-based 330, 340 matching network that allows maximum (or substantially maximum) power transfer between the acoustic transducers 310, 320 while maintaining their optimal electromechanical properties for resonance. Second, a cross-polarity differential switching circuit 350 where modulation is performed by alternating the polarities of the piezoelectric materials (rather than simply opening/closing a single switch as in an antenna Van Atta). The switching circuit 350 may be referred to as a modulator. The switching circuit is configured to reflect an incoming acoustic signal as a back-scattered signal via one or more of: on-off-keying; phase shift keying; and amplitude shift keying.

Figure 4:
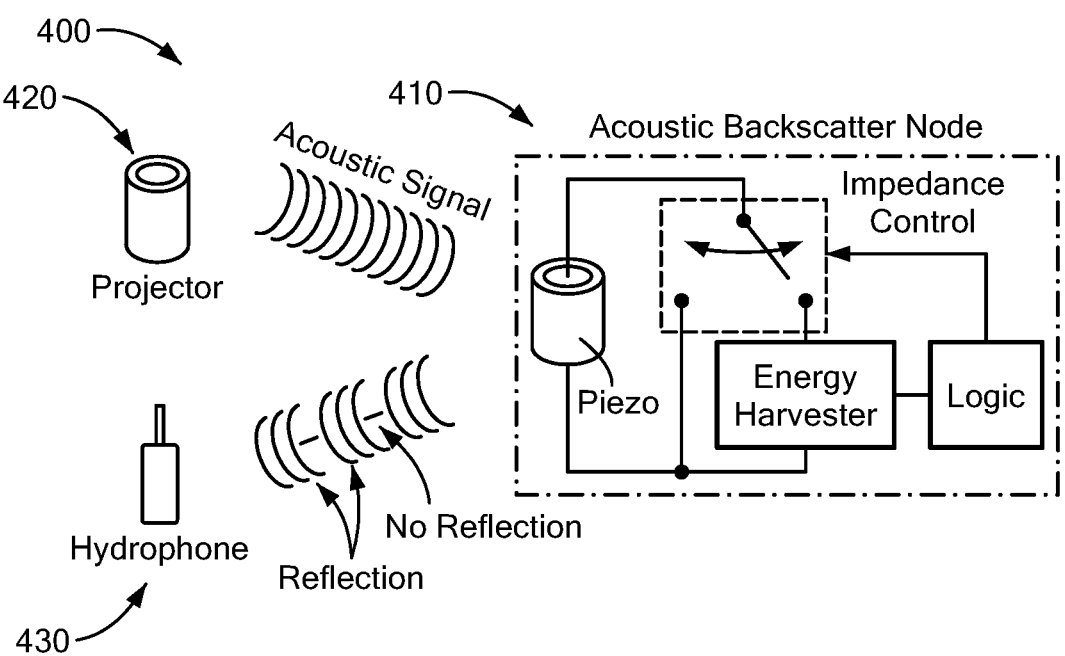
FIG. 4 is an example embodiment of an acoustic backscatter node.

FIG. 4 is an example embodiment 400 of an acoustic backscatter node 410, which communicates bits of zero and one by controlling the piezoelectric impedance switch. In the absorptive states, the sensor can harvest energy. Each acoustic backscatter node 410 has a piezoelectric material which can be switched between two states (meaning reflective and absorptive states) to communicate data in binary. The switching can be done using a transistor. When a projector 420 transmits sound on the downlink, its reflection is modulated by the node 410 using the backscatter switching and received and decoded using an underwater hydrophone 430.

Electrically, the backscatter node changes the reflection coefficient of the piezoelectric material by switching the load impedance $Z_L$ between open (infinity) and a matched load ($Z_L=Z_S^*$, where $Z_S^*$ is the conjugate of the piezoelectric source impedance $Z_S$)). Specifically, the reflected power $P_r$ can be expressed through the following equation:

$$P_r = \left| \frac{Z_L - Z_S^*}{Z_L + Z_S} \right|^2 P_i \qquad (1)$$

where $P_i$ is the incident power.

Underwater backscatter enables building battery-free underwater sensor nodes. By incorporating an energy harvesting unit, these nodes can harvest energy in their absorptive state and use it to power up ultra-low-power embedded designs. Further, the bandwidth of underwater backscatter may achieve higher-order modulation, perform localization via underwater backscatter, and perform wireless underwater imaging using this technology.

Figure 5:
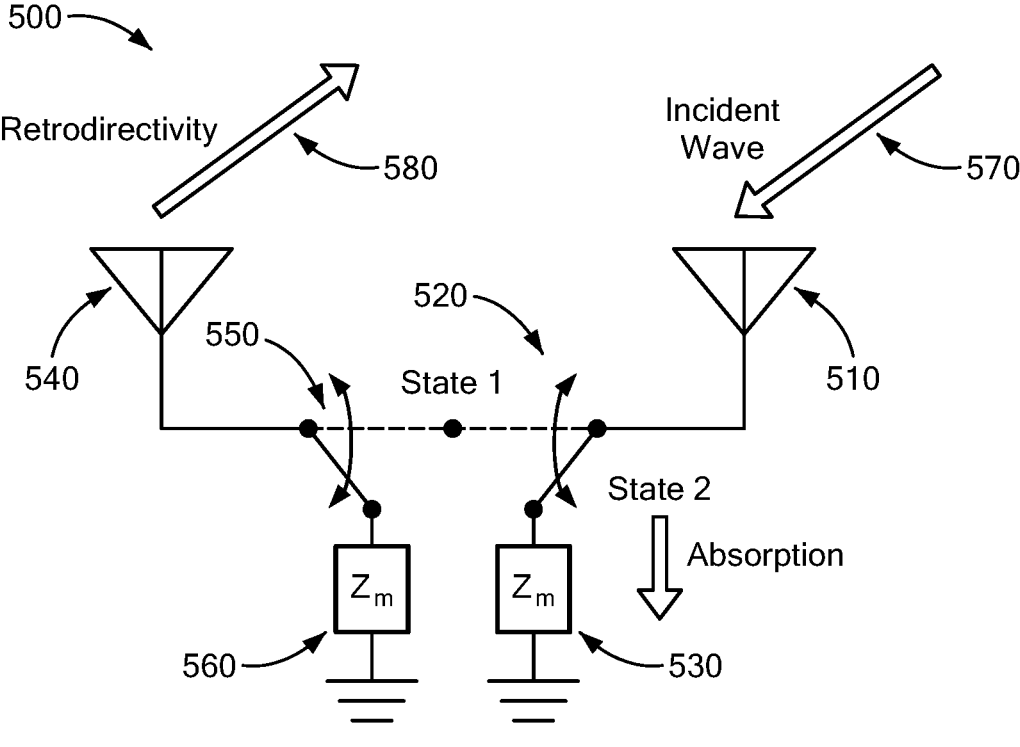
FIG. 5 is an example embodiment of an antenna-based modulated Van Atta network.

FIG. 5 is an example embodiment of an antenna-based modulated Van Atta network 500. The unit cell van atta comprises a first antenna 510 connected or otherwise coupled to a first switch 520 that controls the connection to a first load 530 and a second antenna 540 connected or otherwise coupled to a second switch 550 that controls the connection to a second load 560. The unit cell Van Atta comprises two antennas, two matched loads, and switch to modulate the reflection coefficient, as shown in FIG. 5 with two standard (50Ω) antennas 510, 540. In this design, two switches 520, 550 are used to either connect the two antennas 510, 540 to each other (to retroreflect a signal 580)

or to 50Ω loads 530, 560 (to absorb an incoming signal 570). The antennas receive the incoming signal 570. The switches are simultaneously controlled to alternate between these two states to achieve retrodirective backscatter.

Applying the same network 500 to underwater backscatter is challenging for two reasons. First, unlike antennas, which typically have one main external feeding point (i.e., are single-ended), piezoelectric transducers are differential, that is each of them has two terminals. Therefore, a switch architecture was called for to alternate between different reflective or absorptive states and to increase the backscatter SNR. Because the backscattered signal spreads in all directions, the amount of power that arrives back to the hydrophone ends up being a fraction of the one that arrives at the backscatter node. This power loss degrades the SNR of the received signal and is a factor that limits the communication range of underwater backscatter systems.

Second, aside from the need for a novel switching architecture, the piezoelectric transducers need to be matched to maximize the retroreflective SNR. Unlike antennas which can be easily designed or purchased to have 50Ω or 75Ω impedance, it is difficult to design a piezoelectric transducer to have an impedance that is: first (1), real; and second (2), consistent. First (1), a piezoelectric device is capacitive by nature. Second (2), challenges result in managing consistency, even with tight mechanical tolerances, the fabrication of a sealed transducer results in process variations in the measured impedance. Such variations make it unrealistic to directly connect two acoustic nodes and expect maximum power transfer between them, or to connect each node to a matched load (similar to connecting a 50Ω antenna to a 50 $2 load) and expect perfect absorption of the incoming signal.

Figures 6, 7:
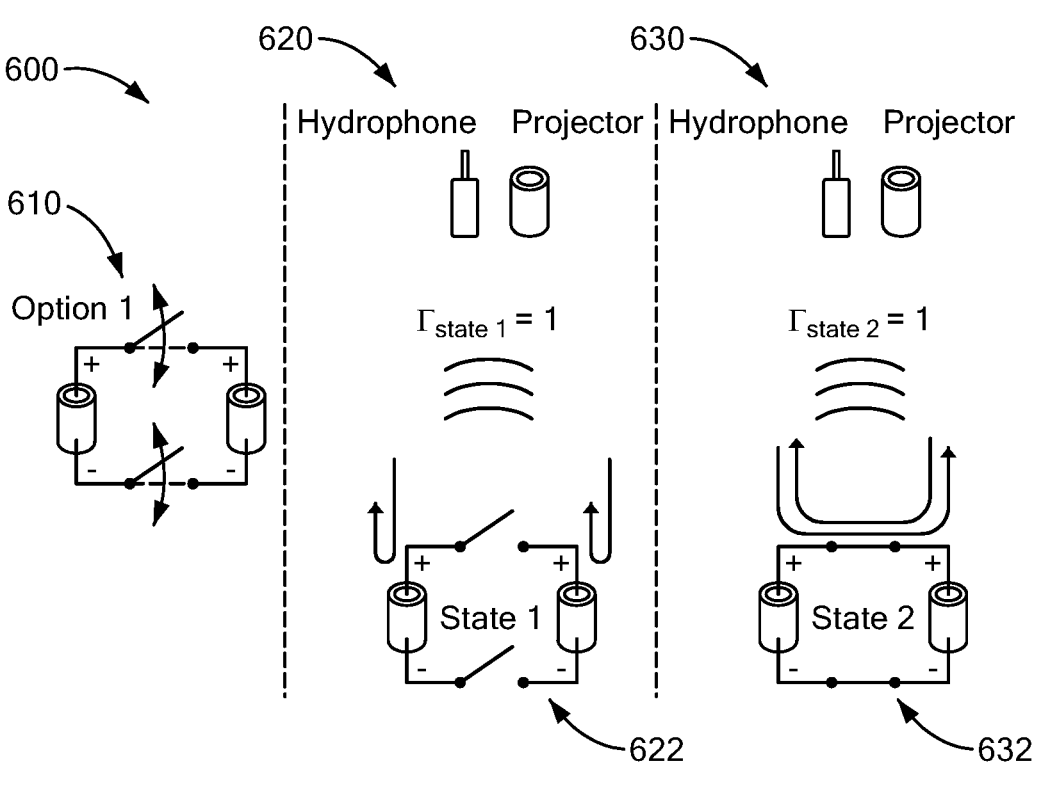
FIG. 6 is a an example embodiment of a VAB network using either pass or reflective switching.
FIG. 7 is an example embodiment of a VAB network using cross-polarity switching.

In order to address these challenges, two proposed mechanisms for switching the piezo-acoustic nodes and their impact on the retrodirectivity performance are disclosed in FIGS. 6 and 7. The difference between the two states (e.g., "reflective" and "non-reflective") is determined in equation (2), which expresses a metric referred to as the modulation factor M.

$$M = |\Gamma_{state1} - \Gamma_{state2}|^2 \qquad (2)$$

where $\Gamma_{state1}$ and $\Gamma_{state2}$ the reflection coefficients, assessed at the hydrophone, of the modulation states. Intuitively, the performance of the backscatter system is ideally the best when the difference between the two states is highest. This is because a larger difference between the states allows the hydrophone to more easily distinguish between the two states, which in turn results in improved detectability and higher SNR. The highest difference refers to the value of the modulation factor M at its maximum, the maximum value of equation (2) is 4.

FIG. 6 is an example embodiment 600 of a network using either pass or reflective switching. The network 610 discloses the movement of the switches been an on state and an off state. In a first example embodiment 620, switches 622 are open (which may be referred to as "state 1"). In a second example embodiment 630, switches 632 are closed (which may be referred to as "state 2").

In the first example embodiment 620, in the "OFF" state, when the switches are open, the incoming wave reaches the nodes and continues its way to an open connection. When faced with an open load, a wave is fully reflected back via each node back to the hydrophone. As a result, the hydrophone sees a reflection coefficient $\Gamma_{state1}$ of 1.

In the second example embodiment 630, in the "ON" state, the node's terminals are connected or otherwise coupled to form a Van Atta pair. Here, the received signal by one node is transmitted through the wire and then emitted by the second node back to the hydrophone. Therefore, in this state, a wave received by one node is re-emitted by the other, resulting in a full reflection from the adjacent node and an effective reflection seen at the hydrophone of $\Gamma_{state1}=1$. The hydrophone also sees a reflection coefficient $\Gamma_{state1}=1$ and since $\Gamma_{state1}-\Gamma_{state2}=0$, the hydrophone is unable detect the backscattered response.

While this switching mechanism offers a Van Atta behavior in the "ON" state, the reflections coming from states 1 and 2 look similar or the same in both amplitude and phase at the hydrophone with $\Gamma_{state1}=$(reflection due to open load), and $\Gamma_{state1}=$(reflection due to transmission from a first acoustic transducer to a second acoustic transducer within the Van Atta). This yields a modulation factor value of 0 (as per Equation (2)), and results in no detectability and low SNR at the hydrophone. A low SNR value is dependent on the modulation and coding scheme. For a Van Atta Backscatter network, binary phase shift keying (BPSK) and no coding may be used. Accordingly, a low SNR may be less than 6 dB, as the bit error rate (BER) for BPSK is at or greater than 1e-3 for an SNR of 6 dB or less. Hence, the potential use for different switching mechanisms.

FIG. 7 is an example embodiment 700 of a network using cross-polarity switching. The network 710 discloses the movement of the switches. In a first example embodiment 720, switches 722 connect like-polarities (which may be referred to as "state 1") and the hydrophone sees a $\Gamma_{state1}=1$. In a second example embodiment 730, switches 732 connect cross-polarities (which may be referred to as "state 2") and the hydrophone sees a $\Gamma_{state2}=-1$. This yields the highest modulation factor of 4, resulting in a highly detectable backscattered response. For network 710, the network mechanism maintains the connection between the two nodes "ON" at all times, but toggles it between in-phase and counter-phase polarities. Each of two transducers have a positive (+) and negative (−) terminal.

In the first example embodiment 720, the node's terminals are connected or otherwise coupled to form a Van Atta pair with like-polarity (positive-to-positive and negative-to-negative), such as example embodiment 630. Therefore, the effective reflection expected at the hydrophone is $\Gamma_{state1}$.

In the second example embodiment 730, the Van Atta pairs are connected or otherwise coupled in cross-polarity (i.e., positive-to-negative and negative-to-positive). Here, due to cross-polarity, the phase of the reflected wave emitted from the Van Atta is 180 shifted from the one created due to state 1 (since reversing the voltage polarities creates an out-of-phase wave). In other words, the effective reflection coefficient at the receiver is $\Gamma_{state1}=-1$.

In this switching architecture, the modulation factor is given by equation (3):

$$M = |\Gamma_{state1} - \Gamma_{state2}|^2 = |1 - (-1)|^2 = 4 \qquad (3)$$

This means that this switching architecture results in the highest possible modulation factor (since the maximum magnitude of the reflection coefficient is 1). Thus, this architecture has the highest detectability and highest SNR at the hydrophone. Detectability corresponds to the magnitude of the modulation factor M, accordingly a high detectability would mean a modulation factor of 2 or greater. A high SNR (above 10 dB) would enable longer range communication.

Figure 8:
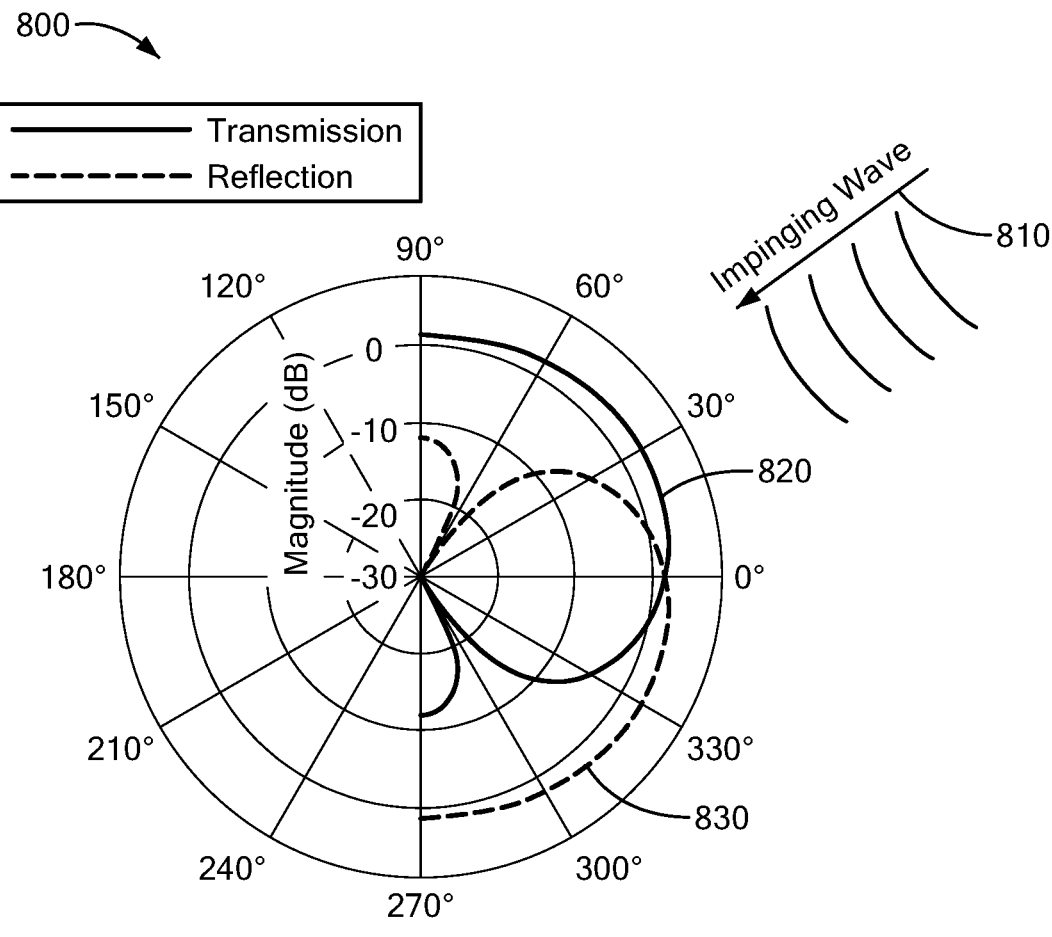
FIG. 8 is an example embodiment of both transmitted and reflected beams of a 2-element Van Atta unit cell.

FIG. 8 is an example embodiment 800 that illustrates the impact of impedance mismatch, disclosing a first simulation of the transmitted and a reflected beams of a 2-element Van Atta unit cell. In the example embodiment 800, an impinging wave 810 arrives from 30°. The Van Atta pair (not shown) is oriented vertically and centered at the origin of the figure. When the impinging wave arrives from 30°, each node transmits half of the power it received to the other node, but the other half is reflected off of the opposing node. This reflection travels back out from the original node that it came from and interferes with the waves that resulted from power transmission between the nodes. The transmission portion gets retrodirected in the 30° direction as shown in a first line 820. However, there is another pattern, the reflection pattern in a second line 830, emitting power at −30°. These two patterns sum together in the amplitude domain to create the total beam. When the two are summed, the array exhibits almost no directional selectivity and loses its retrodirective potential. This highlights the importance of proper matching for maximum power transmission between the nodes.

Another potential complication for switching networks, such as those disclosed in FIGS. 6 and 7, is the impact of the piezoelectric transducer's impedance. A transducer's impedance is complex-valued, highly capacitive, and has significant variability across transducer design (unlike radio frequency (RF) which can be matched to 50Ω).

To see why impedance matching is useful, recall that the operation of the Van Atta depends on the ability of the signal to pass through from one node to another. Accordingly, transfer of the electrical power of one node to the other node, and vice-versa, is called for. The power delivered from one node to the other is given by equation (4):

$$P_L = V_0^2 \frac{R_L}{2|Z_L + Z_S|^2} \qquad (4)$$

where $Z_L$ is the impedance of the node receiving power, $R_L=\text{Re}\{Z_L\}$, $Z_S$ is the impedance of the node delivering power. To increase $P_L$, $|Z_L+Z_S|^2$ is reduced (and ideally minimized). This is achieved by setting $Z_L=Z_S^*$.

However, impedance mismatches between the elements (due to manufacturing differences and lack of 50Ω matching in piezoelectric transducers) hinders the operation of the Van Atta, resulting in more complex electrical behavior within the Van Atta pair. Specifically, rather than being entirely transferred from one node to another, power received by one node will be split into two distinct waves: one that is transmitted to the other node, and one that is reflected back to the original node. This happens simultaneously to both of the waves received on both of the nodes. The resulting beam pattern of the Van Atta array is then composed of two patterns: one generated by the power transfer between the elements (this is the useful retrodirective beam) and one generated by the power reflection between them. Without matching, impedance mismatches create phase errors specifically in the power reflection pattern, causing the reflection pattern to actually rotate in the opposite direction of the desired retrodirective pattern.

Figure 9:
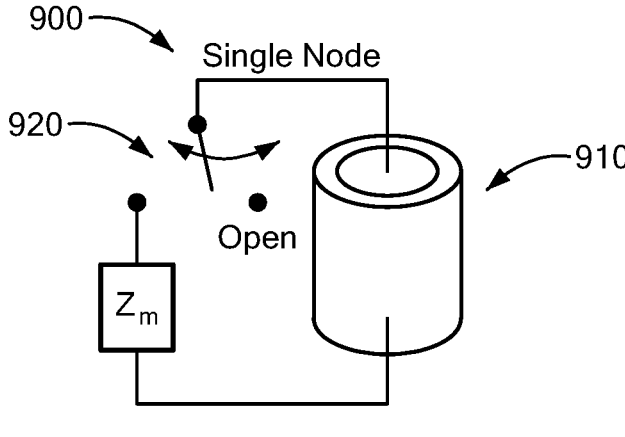
FIG. 9 is an example embodiment of a single acoustic transducer.

FIG. 9 is an example embodiment 900 with a single acoustic transducer 910 switching via a switch 920 between open and matched load states.

Figure 10:
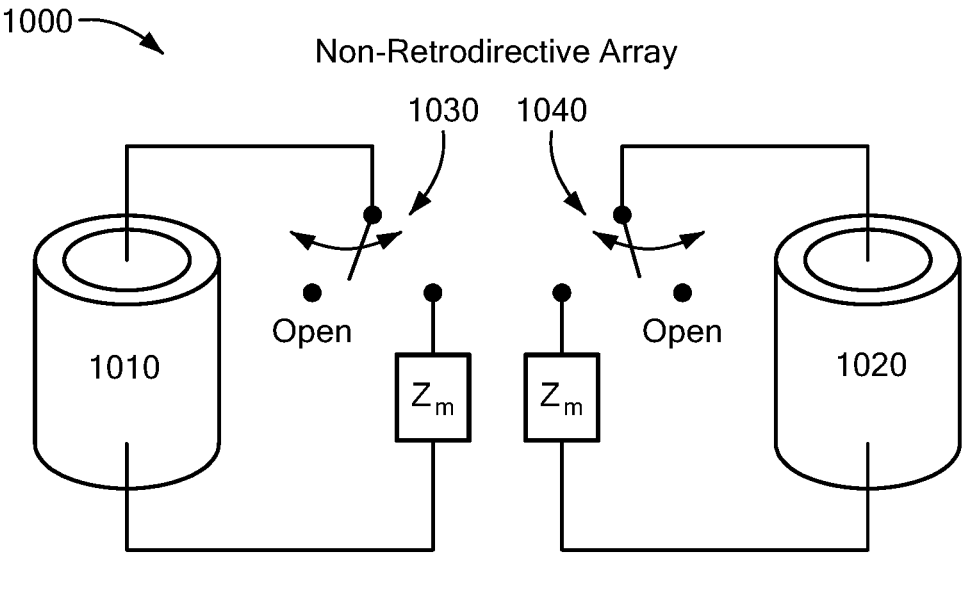
FIG. 10 example embodiment of a two acoustic transducer array.

FIG. 10 is an example embodiment 1000 of a two acoustic transducer array, including a first acoustic transducer 1010 and a second acoustic transducer 1020 switching via a first switch 1030 and a second switch 1040 between open and matched load states. In the 2-element array (both simultaneously) switched between open and matched load states.

Figure 11:
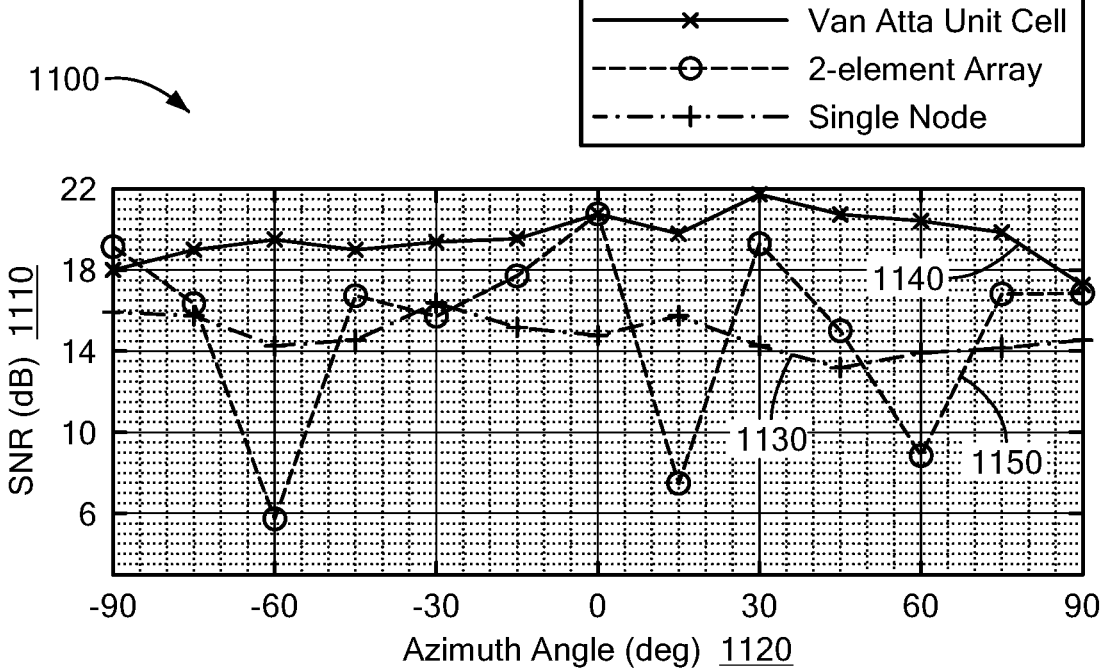
FIG. 11 is a graph of channel signal-to-noise ratio (SNR) vs azimuth angle.

FIG. 11 is a graph 1100 of SNR vs Angle. The channel SNR (dB) 1110 plotted vs. azimuth angle (degrees) 1120 of a single node 1130 (such as the example embodiment 900 of FIG. 9), an array 1150 (such as the example embodiment 1000 of FIG. 10), and a Van Atta unit cell 1140 (such as the VAB unit cell 300 of FIG. 3). The Van Atta unit cell 1140 used cross-polarity switching, such as the cross-polarity switching disclosed in FIG. 7.

The Van Atta unit cell, as tested in FIG. 11, has the potential to satisfy two properties: first, improved SNR over a single element, and second, retrodirectivity vs. incidence angles compared to the basic 2-element array. In order to test the unit cell to determine if it had these properties, a piezoelectric transducer was fabricated as a projector, an off-the-shelf hydrophone as a receiver, and a waveform generator.

In order to determine the change in SNR compared to a single node two experiments were performed: a first, using a single piezoelectric node, such as the example embodiment 900 of FIG. 9; and a second, using a Van Atta unit cell (two piezoelectric nodes connected or otherwise coupled in the Van Atta configuration, as discussed previously) at 0° rotation. These two experiments were run under the exact same conditions: the projector is fixed at a transmit voltage of 90 Vrms, the depth of all of the devices are fixed at 2.5 m, and the projector, hydrophone, and backscatter device are collinear in that order and separated 1 m apart from each other. For each of the two experiments, the median SNR in dB was computed for 625 packets of 24 bits each. 10 trials were run in total. The results indicate that the median SNR of the Van Atta network improved over a single node by about 5.9 dB. This shows that the Van Atta indeed provides improvement over a single node. The result agrees well with the maximum theoretically expected improvement over a single-node of $$20 \log_{10}(N) = 6 \text{ dB for } N = 2. \qquad [21]$$

Next, it was evaluated whether the Van Atta provides retrodirectivity across rotations, to compare retrodirectivity vs. incident angles. Here, in addition to comparing the Van Atta unit cell to a single node, the 2-element example embodiment 1000 was also compared. In this experiment, the round-trip distance was fixed at 3 m, while the other parameters were kept the same as the previous experiment described above. Both the Van Atta unit cell and the array were rotated from −90° to +90° in 5° increments and computed median SNR across 625 packets at each rotation. FIG. 11 illustrates the result of this experiment. As discussed in the graph 1100, the median SNR of the Van Atta unit cell remains relatively constant across rotations (varies by about 2 dB (+/−0.5 dB)). This shows that the Van Atta achieves retrodirectivity as it can hold similar SNR across rotations. There are some small fluctuations in the SNR of the Van Atta unit cell as the rotation changes, but this is expected due to the uncertainty of the conditions of the water channel at any given rotation. In contrast, the median SNR of the 2-element array fluctuates by more than 10 dB across rotations. This shows that the 2-element array in unable to achieve retrodirectivity.

Figure 12:
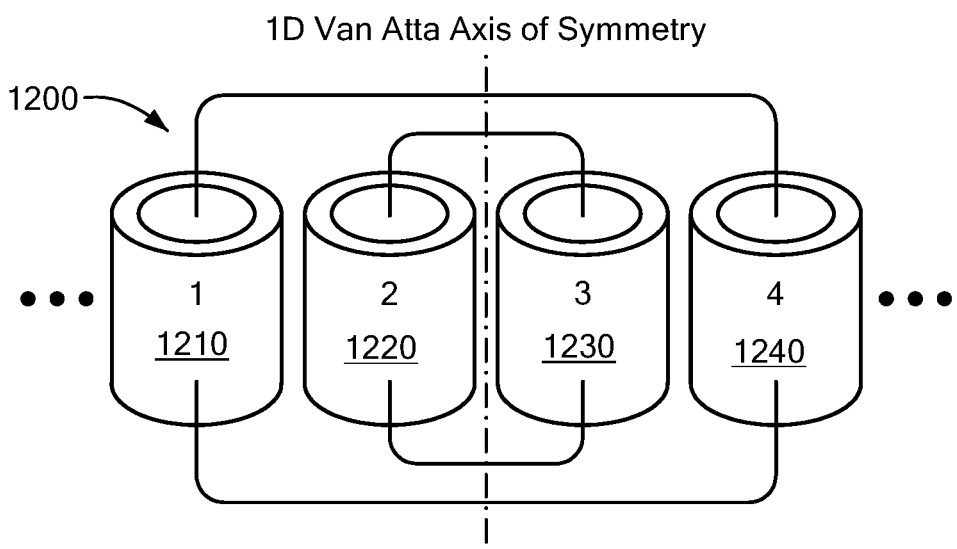
FIG. 12 is an example embodiment of a 1D Van Atta Array, wherein four 4 elements are disclosed with pairs coupled around an axis of symmetry to form a Van Atta.

FIG. 12 is a 1D Van Atta Array 1200, wherein four elements are disclosed with two pairs connected or otherwise coupled around an axis of symmetry to form a Van Atta. FIG. 12 shows the architecture of a 4-element Van Atta array. To achieve retrodirectivity, the elements are connected or otherwise coupled around an axis of symmetry realized here by choosing the inner transducers (a second node 1220 and a third note 1230) as one pair, and the outer ones (a first node 1210 and a fourth node 1240) as the other pair, connecting each pair, and switching them simultaneously. The SNR gain of the Van Atta is 20 $\log_{10}$(N), where Nis the number of elements in the array.

While extending the Van Atta array beyond two elements provides an SNR gain proportional to the number of elements, a Van Atta array with more than two elements poses challenges unique to the piezoacoustic domain. Since acoustic transducers are 3D structures, rather than planar as is the case with RF/mm-waves Van Atta arrays, their interrogation from oblique angles becomes a problem due to blockage and diffraction caused by nearby nodes.

Figure 13:
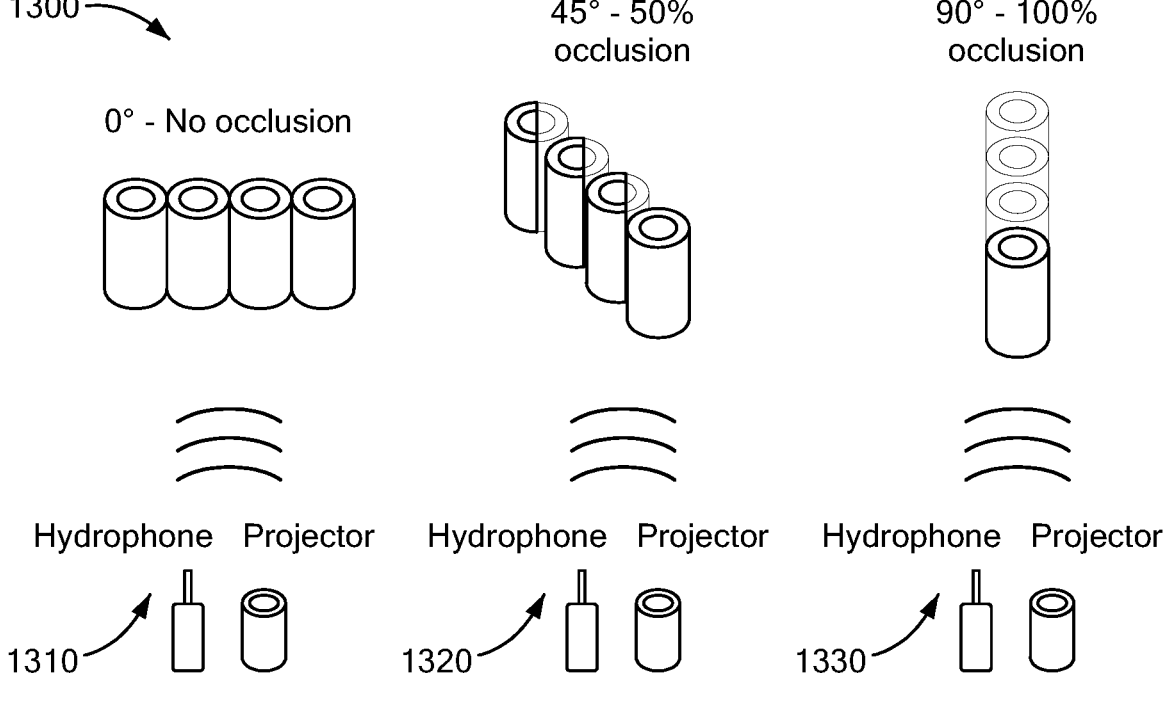
FIG. 13 is one or more examples of a VAB network architecture, disclosing the occlusion problem in 1D arrays.

FIG. 13 is one or more examples 1300 of a VAB network architecture, disclosing the occlusion problem in 1D arrays. As seen in examples 1300, where four elements are first placed at 0° in a first example 1310, then rotated to 45° in a second example 1320, and 90° in a third example 1330 with respect to the projector/hydrophone. Due to their physical size, elements that are closer to the source begin to occlude those that are further.

In the first example 1310, the projector and hydrophone have a direct line-of-sight to all elements. In the first example 1310, the array an angle of 0° with respect to the projector-hydrophone pair does not suffer from occlusion. However, in the second example 1320, when the array is at a 45° rotation with respect to the hydrophone-projector pair, about 50% of each of the nodes (aside from the nearest one) are occluded (the occluded region is represented by faded grey). Such occlusions reduce the amount of power delivered to the occluded nodes. In the second example 1320, at a 45° rotation, the array would suffer from around 50% occlusion due to physical blockage from other nodes.

This issue becomes more problematic when the array is at 90° rotation as in the third example 1330. Here, almost all the nodes aside from the first are entirely blocked. As can be seen in the third example 1330, the occlusion worsens to 100% with a 90° rotation. This significantly impacts the performance of the Van Atta array and prevents it from achieving the expected gains at large angles. Addressing this problem is important since in practical deployments a user may not know where the backscatter array is deployed, or the projector/hydrophone may be mounted on a mobile drone whose orientation is bound to change with respect to the array as it travels.

Figure 14:
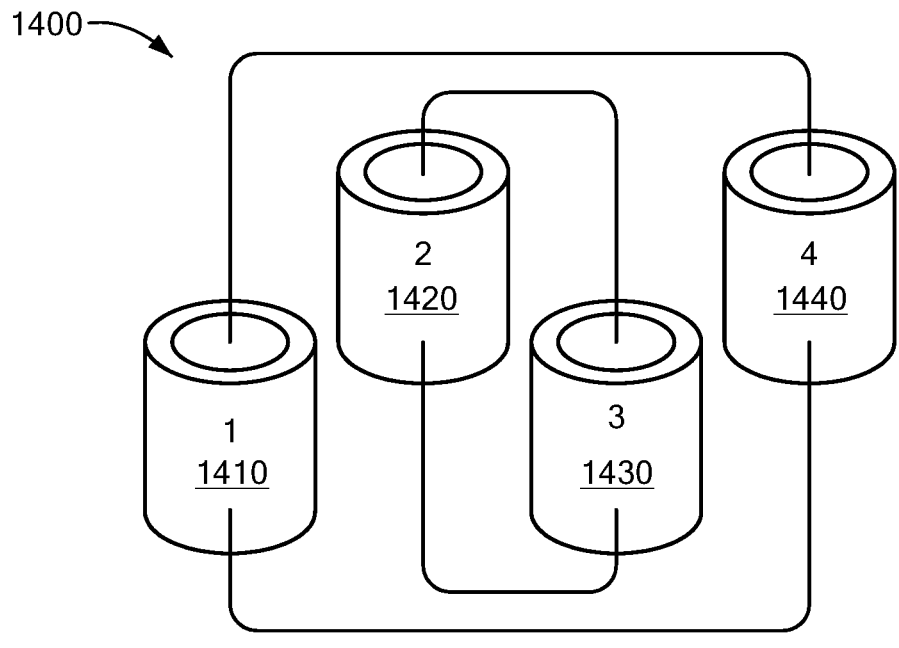
FIG. 14 is a Van Atta Array with a staggering architecture creating a difference in elevation between the elements in a pair of the Van Atta.

FIG. 14 is a Van Atta Array 1400 with a staggering architecture creating a difference in elevation between the elements in a pair of the Van Atta. FIG. 14 illustrates the approach to staggering for a four-element Van Atta array, where two nodes in the same pair are placed at different levels. A first node 1410 is in the same pair as, but at a different level compared to, a fourth node 1440. A second node 1420 is in the same pair as, but at a different level compared to, a third node 1430.

The elements of the array are staggered by placing them at different heights. Such an approach allows interrogating signals to fully reach all the elements at all rotations, thus bringing the full gain of the Van Atta across all orientations. While this architecture does not completely remove the occlusion problem, it does significantly alleviate it, allowing for acoustic power to have a direct line of sight to at least two elements, instead of one.

3D Orientation-Agnostic Acoustic Van Atta Arrays build upon the design comprising of two transducers, extending the retrodirective structure to an array of units that allows achieving a higher retrodirectivity gain. A challenge presented was the blockage and diffraction caused by nearby nodes due to their volumetric size. Staggering can be employed to overcome this problem, where rather than placing the nodes at uniform spacing (as in traditional Van Attas), the nodes are distributed in a 2D plane. Further, through developments a 3D coverage in both azimuth and elevation is possible. Such extended coverage would enable the acoustic transducer to respond reliably and efficiently to all interrogations impinging from any plane.

Figure 15:
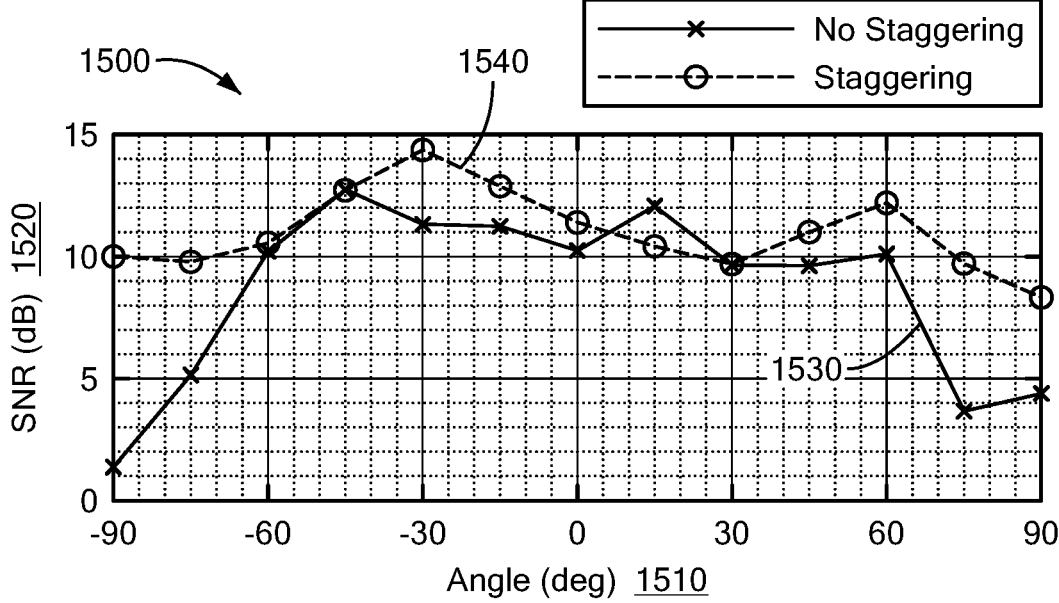
FIG. 15 is a graph of channel SNR vs. Angle for a Van Atta Array with and without staggered architecture.

FIG. 15 is a graph 1500 of channel SNR vs. angle for an example such as Van Atta Array with staggered topology (topology and architecture may be used interchangeably throughout this disclosure), such as the Van Atta Array 1400. The graph 1500 discloses a channel SNR (dB) 1520 vs. an azimuth angle (degrees) 1510 of the non-staggered 4×1 Van Atta array 1530 and the staggered 4×1 Van Atta array 1540. A communication test of both the staggered and non-staggered topologies for a 4×1 Van Atta array was conducted to evaluate the impact of staggering by rotating both arrays from −90° to +90° in steps of 15° and compared their SNRs at each angle. The transmitter voltage was fixed at 60 Vrms, the devices are 2.5 m deep in the water, and the projector, hydrophone, and backscatter device are collinear in that order. The projector is 1 m away from the hydrophone and the backscatter device is 5 m away from the hydrophone. 625 packets of 24 bits each were sent, following the median SNR was computed for each architecture at each angle.

Without staggering, the 4×1 Van Atta array experiences a significant drop in the channel SNR of more than 6 dB beyond 60°. This is expected due to the occlusion problem described in relation to FIG. 13. However, with the implementation of staggering in the 4×1 array, the SNR at −90°, −75°, +75°, and +90° is larger by at least 4 dB and at most 9 dB, significantly improving the SNR at large incidence angles. Therefore, by staggering the Van Atta array elements, the occlusion problem can be overcome and a truly orientation-agnostic retrodirective piezoacoustic backscatter can be achieved.

Figure 16:
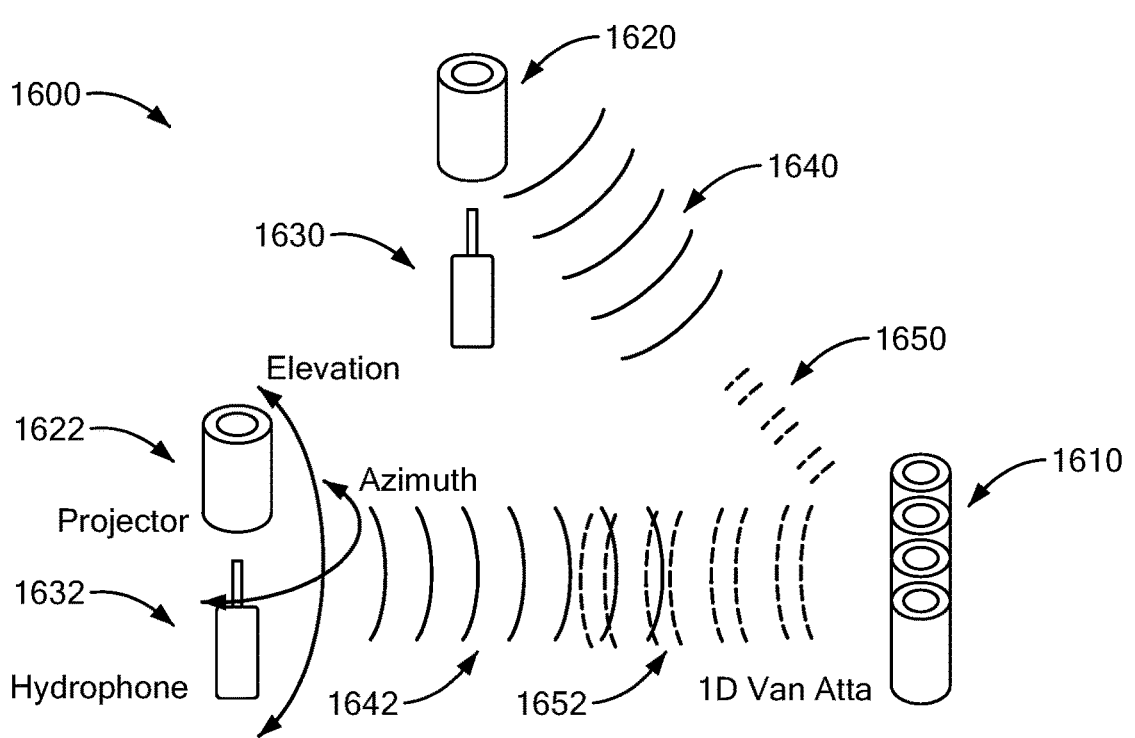
FIG. 16 is an example embodiment of responses for a Van Atta in elevation and situated in the same plane.

FIG. 16 is an example embodiment 1600 of responses for a one dimension (1D) Van Atta network in elevation and azimuth under a surface of the water. A 1D Van Atta 1610 has a response 1650 to a signal 1640 coming from a projector 1620 (which acts as a transmitter) and a hydrophone 1630 pair at an elevation and a response 1652 to a signal 1642 coming from a projector 1622 and a hydrophone 1632 pair situated in the same plane. In this case, in the same plane meaning a retrodirective performance in horizontal plane of the array (i.e., azimuth plane). The 1D van atta 1610 is a receiver that received the incoming acoustic signal 1640, 1642 and a reflector that reflects back the incoming acoustic signal 1640, 1642 in a second direction as a signal 1650, 1652. A modulator, such as the switching circuit 350 described above in relation to FIG. 3, is coupled or otherwise connected to the 1D van atta 1610 and modulates the reflected incoming acoustic signal as a backscattered signal. The 1D array enables two-dimensional (2D) retro-directivity.

The azimuth plane is the plane intersecting the center of symmetry of the transmitter (in FIG. 16, the projector 1622) and the receiver (in FIG. 16, the 1D Van Atta 1610) and parallel to the surface of the water (the surface of the water not shown, the surface of the water maybe referred to herein as the horizontal plane).

The elevation plane is the plane intersecting the center of symmetry of the transmitter (in FIG. 16, the projector 1620) and the receiver (in FIG. 16, the hydrophone 1630) perpendicular to the plane of the surface of the water and parallel to the direction vector from the van atta (in FIG. 16, the 1D Van Atta 1610) to the transmitter (in FIG. 16, the projector 1620) and the receiver (in FIG. 16, the hydrophone 1630) pair (this may be referred to herein as the vertical plane).

The 1D Van Atta 1610 has a weaker response 1650 to the signal 1640 coming from the projector 1620 and the hydrophone 1630 pair at an elevation. Weaker meaning less received SNR relative to the received SNR that would be received if the transmitter and receiver pair was at broadside of the van atta, or at elevation and azimuth angles of 0 degrees. The response 1650 is weaker compared to the stronger response 1652 from the signal 1642 coming from the projector 1622 and the hydrophone 1632 situated in the same plane. Stronger SNR relative to the weaker SNR response 1650, the stronger response 1652 may be the maximum SNR.

As long as the projector 1622 and hydrophone 1632 are located in the horizontal plane of the 1D van atta 1610 the 1D van atta 1610 could be interrogated from any angle and it would efficiently respond with a signal back in the direction of the impinging wave. However, when interrogated by a signal in the elevation plane, such as the projector 1620 and a hydrophone 1630, say an underwater drone sending a ping from above or below the node, the 1D Van Atta 1610 would backscatter a much weaker signal. This is due in part to a lack of array gain in the elevation as well as missing retrodirectivity.

The second design focused on extending retrodirectivity to the elevation plane through a 2D structure. Not only did the new architecture allow the Van Atta to respond to signals coming from above or below it, but also expanded the number of elements resulting in increased gains ($20 \log_{10}(N)$ with N number of elements in the array), thus extended communication ranges.

Figure 17:
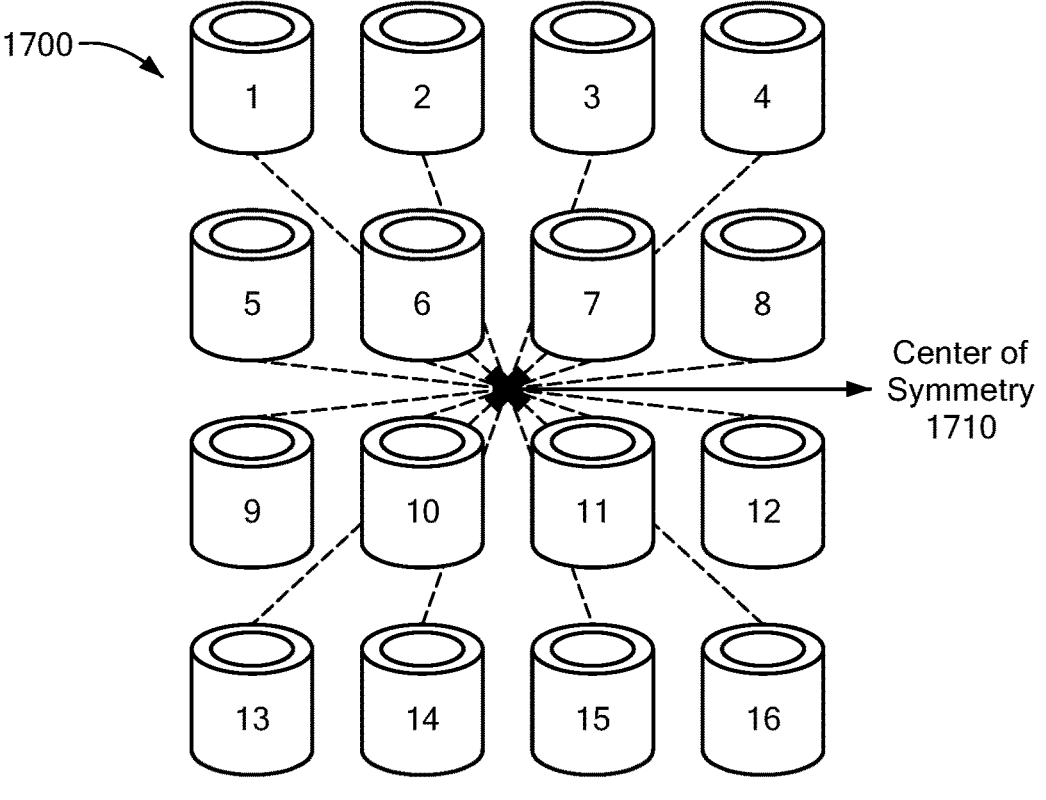
FIG. 17 is an example embodiment of a 4×4 architecture, where elements are coupled around a center of symmetry.

FIG. 17 is an example embodiment 1700 of a 4×4 architecture, where elements are connected or otherwise coupled around a center of symmetry 1710. Center of symmetry refers to the center of mass of the piezo acoustic nodes (denoted in FIG. 17 by numbers 1, 2, 3, etc.). The difference between a center of symmetry and an axis of symmetry is the center is a point (such as the center of symmetry 1710) and an axis is a line.

For an embodiment comprising a 2D Van Atta such as FIG. 17, there can be two axes of symmetry: first, along the horizontal plane; and second, along the vertical plane. Both axes of symmetry pass through the center of symmetry.

In another embodiment comprising a van atta with an odd number of rows or columns, the van atta will have a center or axis of symmetry. With an odd number of rows or columns, the center or axis of symmetry would intersect a piezo acoustic node. However, without clear visual symmetry the van atta will response (or received SNR) across the elevation or azimuth angles would correspondingly not be symmetric about 0 degrees. Further, when overall (overall meaning the entire array) horizontal symmetry or vertical symmetry is not present, the individual axes of symmetry for each van atta unit cell are not guaranteed to intersect the center of symmetry of the entire array.

Figure 18:
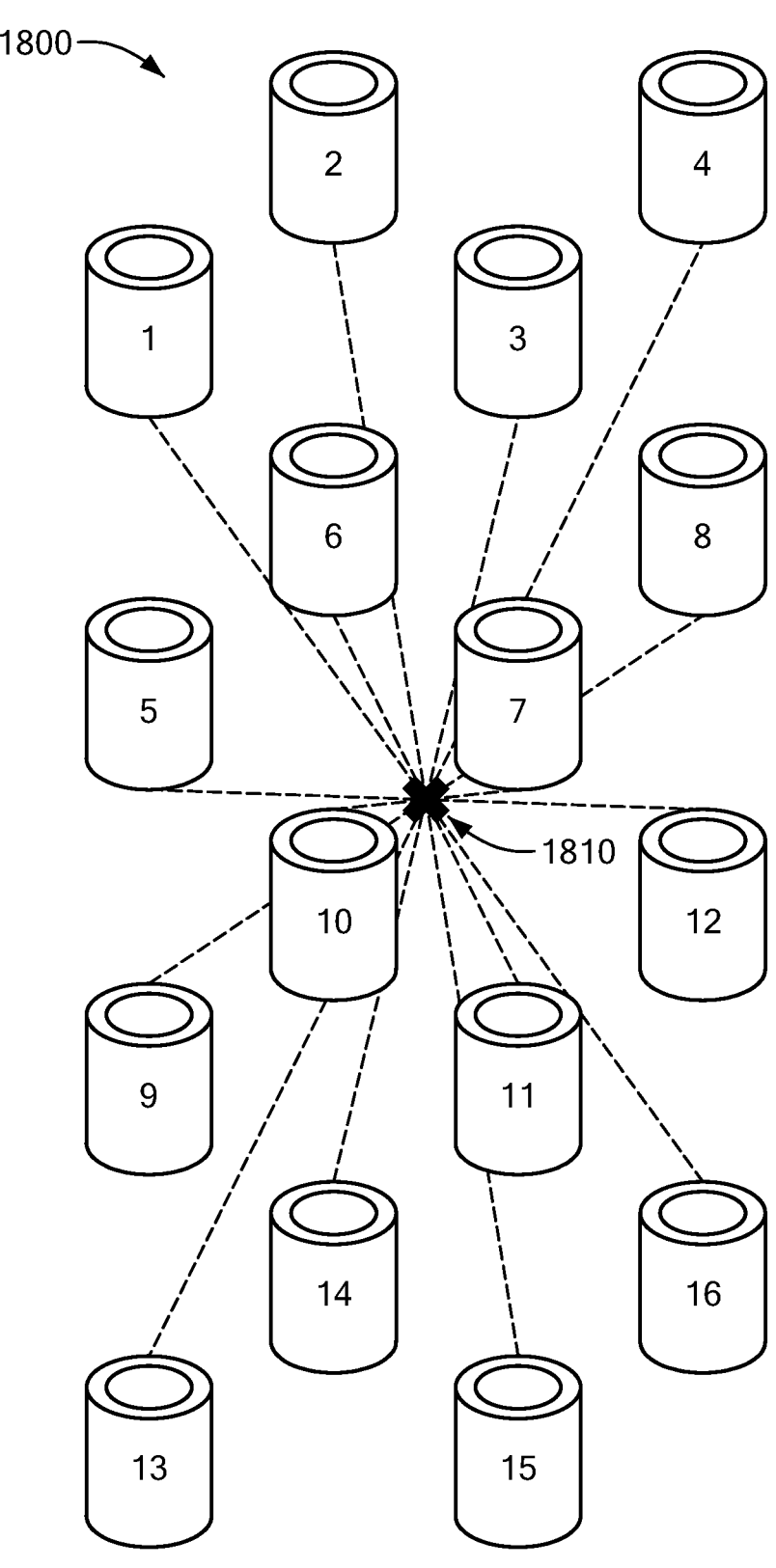
FIG. 18 is an example embodiment a 4×4 staggered architecture, where elements are coupled around a center of symmetry.

FIG. 18 is an example embodiment of a 2D Van Atta Staggered Architecture 1800, where elements are connected or otherwise coupled around a center of symmetry 1810. Extending the 1D array to a 2D architecture enables 3D retrodirectivity.

While the horizontal 1D array, previously proposed, covered the azimuth plane, the vertical array covers the elevation one. Enabling a 3D retrodirective coverage underwater is highly desirable as it releases constraints on the exact positioning of the projector and hydrophone, and unlocks implementations in new underwater environments. The design of Van Atta-based 2D arrays is challenging and uncommon even at RF, with the exception of few prior RF designs. While a 1D Van Atta is composed of an array of elements interconnected or otherwise coupled in symmetrical pairs with reference to an axis of symmetry, the 2D array rather requires a center of symmetry, such as example embodiment 1800.

The design of a 2D array carries the challenges associated with that of a 1D array in both planes. Similar to how increasing the number of elements in one axis could lead to occlusion and thus hinders the performance of the Van Atta at oblique angles, the addition of more rows would result in the same problem with a wave interrogating the array from above or below. Therefore, to mitigate this problem, the elements of the array are staggered in both dimensions.

To illustrate the 2D concept with the center of symmetry described earlier, example embodiment 1800 includes a staggered architecture wherein the staggering, such as that staggering implemented in FIG. 14, occurs over 4 rows. To produce a retrodirective response in both planes one must ensure that all interconnected or otherwise coupled pairs revolve around the center or the point in the middle of the structure. Examples of connected or otherwise coupled pairs would be: (7,10), (6,11), (2,15), (4,13), etc.

An example embodiment of this 2D structure was built using 8 elements, realizing a 4×2 2D array, and evaluated over both azimuth and elevation angles. The performance of this 4×2 array was also compared to a similarly-sized conventional array, differently-sized Van Atta structures, and a single backscatter node and presented later in the evaluation section.

Figure 19:
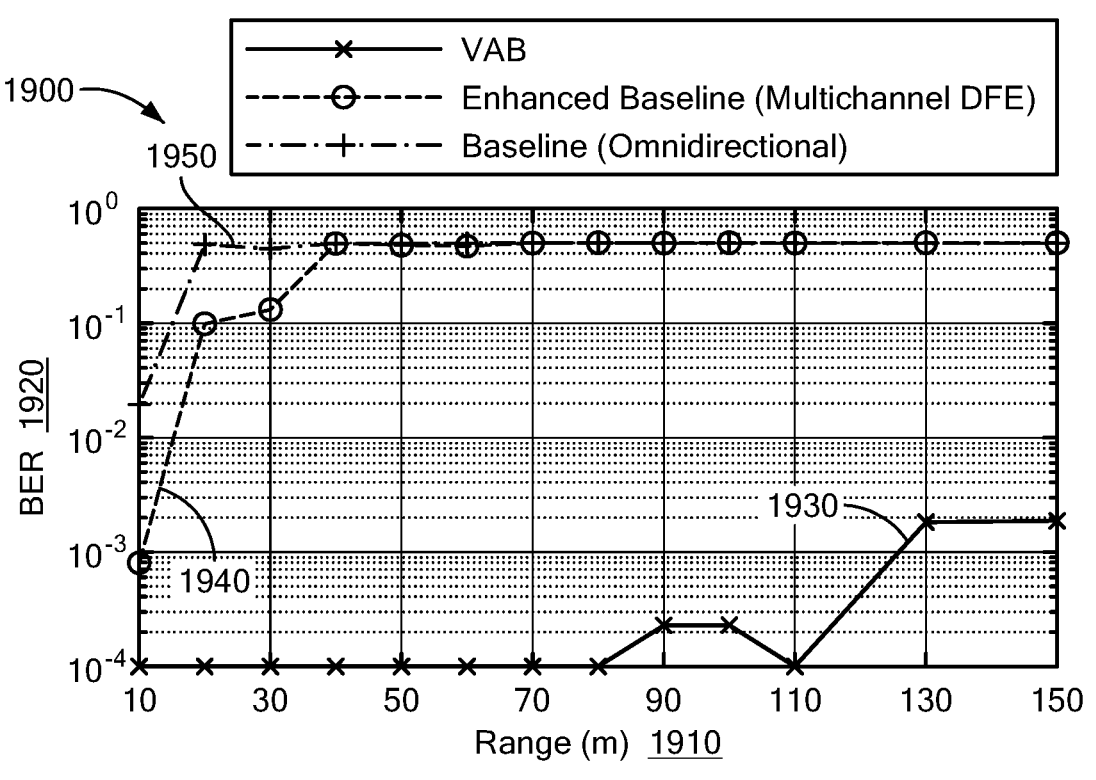
FIG. 19 is an graph of bit error rate (BER) vs. range.

FIG. 19 is an graph 1900 of bit error rate (BER) 1920 vs. range (m) 1910 for the Van Atta backscatter 1930, an enhanced baseline (multichannel DFE) 1940, and a baseline (omnidirectional) 1950. The enhanced baseline (multichannel DFE) 1940 was tested using a single node backscatter with DFE. The baseline (omnidirectional) 1950 was tested using a single node backscatter without DFE.

Figure 20:
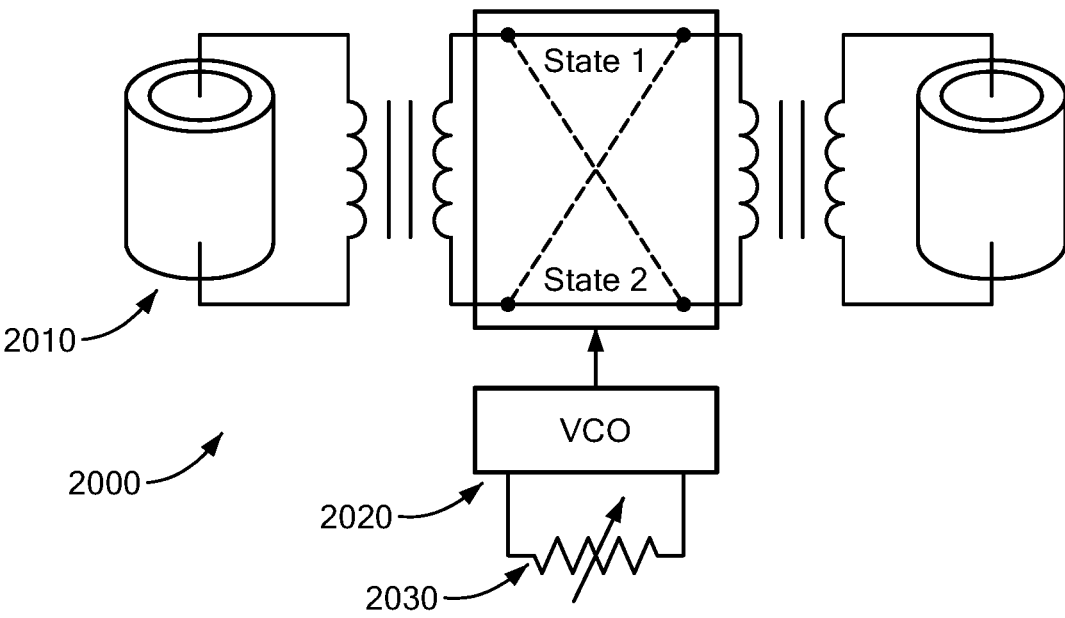
FIG. 20 is an example embodiment of a van atta unit cell, a voltage controlled oscillator (VCO), and a sensor.

FIG. 20 is an example embodiment 2000 of a van atta unit cell 2010, including a voltage controlled oscillator (VCO) 2020 and a sensor 2030. The VOC 2020, sensor 2030, and switch within the van atta unit cell 2010 comprise an analog modulation circuit.

The sensor 2030 includes a variable resistor, for example the resistor could be a thermistor (i.e. a temperature dependent resistor). As the value of the sensor 2030 changes, its resistance also changes. The sensor 2030 has an output coupled or otherwise connected to the van atta unit cell 2010.

The VCO 2020 uses the changes in the resistance of the sensor 2030 to output a square wave with a frequency that is directly related to the sensor's resistance. The output frequency may be directly proportional to the sensors 2030 resistance, but does not have to be. The square wave then modulates the switch in the van atta unit cell 2010.

Figure 21:
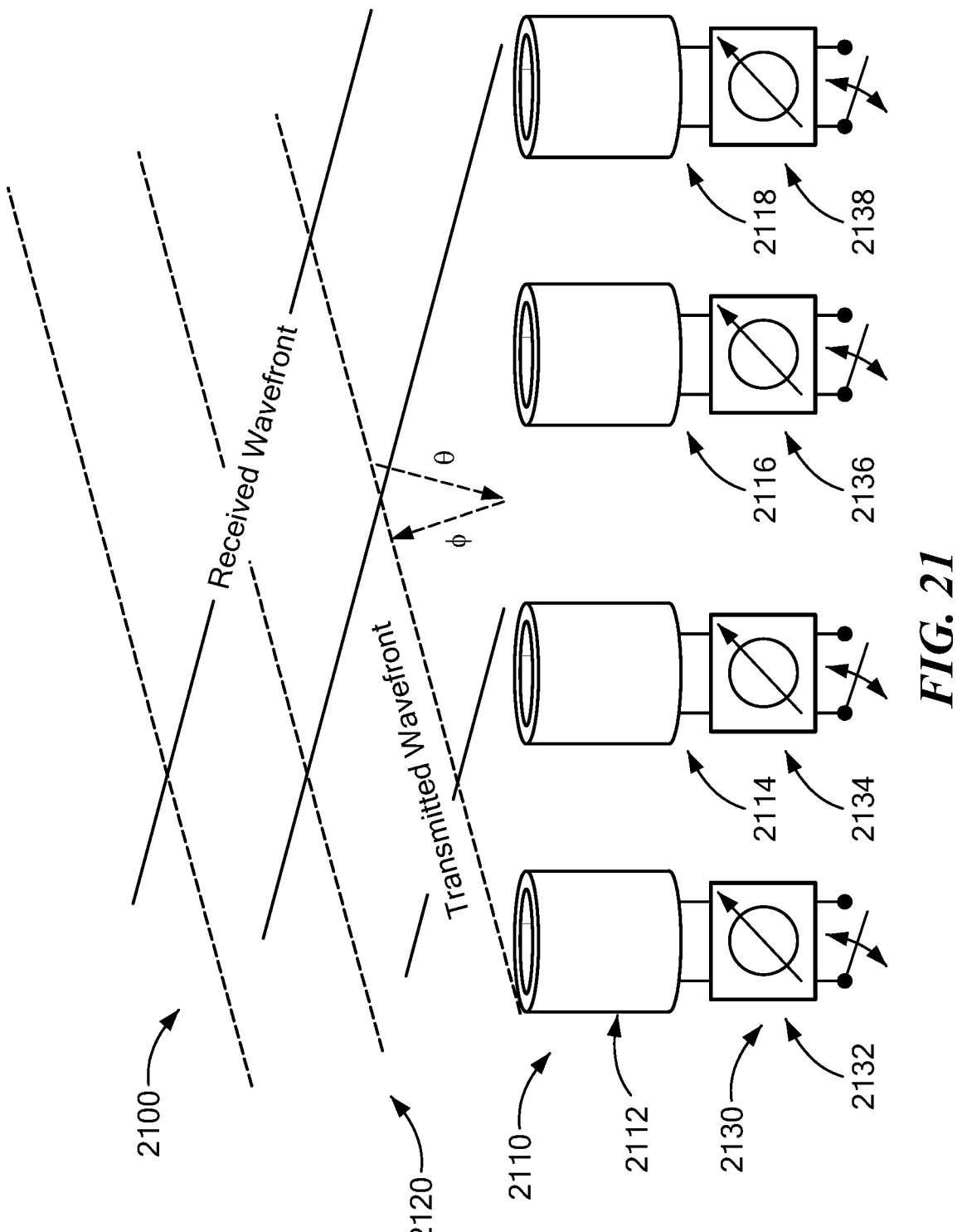
FIG. 21 is an example embodiment of a 4-element piezoelectric array and a received and transmitted wavefront.

FIG. 21 is an example embodiment 2100 of a 4-element piezoelectric array 2110 and a received and transmitted wavefront 2120. In order to control the reflected phases of each signal, and thus the direction that the transmitted wavefront travels in, each van atta unit cell (or transducer) of the array 2110 is coupled or otherwise connected to a controller 2130. The controller 2130 controls the phases between the transducers. A first transducer 2112 is coupled or otherwise connected to a first controller 2132. A second transducer 2114 is coupled or otherwise connected to a second controller 2134. A third transducer 2116 is coupled or otherwise connected to a third controller 2136. A fourth transducer 2118 is coupled or otherwise connected to a fourth controller 2138.

The controller 2130 includes one phase shifter and one switch for each transducer. The phase of each phase shifter is set in conventional delay-and-sum beamforming, wherein the incremental phase shift called for at each node are given by the following equation: delta=k*d*(sin(phi)+sin(theta)), where k is the wavevector, d is the separation between the transducers, theta is the direction that the received wavefront arrives from, and theta is the direction the incoming wave re-transmits to. As an example, the first transducer 2112 is phase shifted by 0 degrees, the second transducer 2114 is phase shifted by delta relative to the phase of first transducer 2112, the third transducer 2116 is phase shifted by 2*delta relative to the phase of first transducer 2112, and the fourth transducer 2118 is phase shifted by 3*delta relative to the phase of first transducer 2112.

Although reference is made herein to particular materials, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a connection or coupling of entities can refer to either a direct or an indirect connection or coupling, and a positional relationship between entities can be a direct or indirect positional relationship.

As an example of an indirect positional relationship, references in the present description to forming structure or layer "A" over structure or layer "B" include situations in which one or more intermediate structures or layers (e.g., structure or layer "C") is between structure or layer "A" and structure or layer "B" as long as the relevant characteristics and functionalities of structure or layer "A" and structure or layer "B" are not substantially changed by the intermediate structures or layers.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal, "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected or otherwise coupled without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The terms "substantially" and "substantially equal" may be used to refer to values that are within ±20% of one another in some embodiments, within ±10% of one another in some embodiments, within ±5% of one another in some embodiments, and yet within ±2% of one another in some embodiments.

For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A retroreflective underwater backscatter node, comprising:
   a receiver that receives an incoming acoustic signal from a first direction;
   a reflector that reflects back an incoming acoustic signal in a second direction;
   a modulator coupled to the reflector to modulate the reflected incoming acoustic signal as a back-scattered signal; and
   a van-atta unit cell comprising at least two acoustic transducers coupled to each other and arranged to provide the retroreflective underwater backscatter node having a retro-directivity characteristic.

2. The retroreflective underwater backscatter node of claim 1, wherein the first direction and second direction are substantially the same such that the retroreflective underwater backscatter node retro-directs an incoming acoustic signal as a back-scattered signal and incoming and back-scattered acoustic signals propagate in the same but substantially opposite directions.

3. The retroreflective underwater backscatter node of claim 1, wherein the first direction and second direction are substantially the same such that the retroreflective underwater backscatter node retro-directs an incoming acoustic signal as a back-scattered signal and incoming and back-scattered acoustic signals propagate in opposite directions at substantially the same angle.

4. The retroreflective underwater backscatter node of claim 1, wherein the receiver and reflector comprise acoustic transducers.

5. The retroreflective underwater backscatter node of claim 4, wherein the acoustic transducers are coupled in a cross-polarized fashion.

6. The retroreflective underwater backscatter node of claim 1, further a transformer.

7. The retroreflective underwater backscatter node of claim 1, further comprising an array of van-atta unit cells.

8. The retroreflective underwater backscatter node of claim 7, wherein the array of van-atta unit cells are arranged to perform at least one of:

two-dimensional (2D) retro-directivity; and three-dimensional (3D) retro-directivity.

9. The retroreflective underwater backscatter node of claim 7, wherein the van-atta unit cells in the array of van-atta unit cells are arranged in a staggered topology.

10. The retroreflective underwater backscatter node of claim 1, wherein the modulator comprises a switching circuit.

11. The retroreflective underwater backscatter node of claim 10, wherein the switching circuit is configured to reflect an incoming acoustic signal as a back-scattered signal via one or more of:

on-off-keying;

phase shift keying; and amplitude shift keying.

12. The retroreflective underwater backscatter node of claim 1, wherein the retroreflective underwater backscatter node further comprises a sensor having an output coupled to retroreflective underwater backscatter node.

13. The retroreflective underwater backscatter node of claim 1, further comprising a controller coupled to the transducers, the controller operable to control phases between the transducers.

14. A retroreflective underwater backscatter node, comprising:

a receiver that receives an incoming acoustic signal from a first direction;

a reflector that reflects back an incoming acoustic signal in a second direction; and a modulator coupled to the reflector to modulate the reflected incoming acoustic signal as a back-scattered signal, wherein the first direction and second direction are substantially different such that the retroreflective underwater backscatter node retro-directs an incoming acoustic signal as a back-scattered signal and back-scattered acoustic signals propagate in a direction different than a direction of the incoming acoustic signal.

15. An underwater communication system, comprising:

one or more backscatter nodes; and an acoustic receiver with the one or more backscatter nodes responsive to intercepted acoustic signals with the one or more backscatter nodes configured to retro-direct the intercepted acoustic signals back toward the acoustic receiver and in response to a retro-direct the intercepted acoustic signal provided thereto, the acoustic receiver receives and decodes the retro-direct intercepted acoustic signal, wherein the acoustic receiver comprises a hydrophone.

16. The underwater communication system of claim 15, further comprising an acoustic signal transmitter arranged proximate the acoustic receiver wherein the one or more backscatter nodes are responsive to transmitted acoustic signals provided to the one or more backscatter nodes by the acoustic signal transmitter.

17. The underwater communication system of claim 15, wherein the acoustic receiver includes an array of acoustic receive elements coupled such that the acoustic receiver is capable of performing beamforming.

18. The underwater communication system of claim 16, wherein the acoustic signal transmitter is configured to generate a transmitted downlink acoustic signal and is further configured to perform beamforming.

* * * * *